(12) United States Patent
Guha et al.

(10) Patent No.: US 6,601,212 B1
(45) Date of Patent: Jul. 29, 2003

(54) METHOD AND APPARATUS FOR DOWNLOADING FIRMWARE TO A NON-VOLATILE MEMORY

(75) Inventors: Biswaroop Guha, Roseville, CA (US); William Ross Boland, Orangevale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/537,329

(22) Filed: Mar. 29, 2000

(51) Int. Cl.$^7$ .................. H03M 13/00; G11C 29/00; G06F 11/22

(52) U.S. Cl. .................. 714/776; 714/766; 717/178; 717/173

(58) Field of Search ................. 714/776, 766; 717/168–178

(56) References Cited

U.S. PATENT DOCUMENTS

| | | | | |
|---|---|---|---|---|
| 5,519,869 A | * | 5/1996 | Payne et al. | 702/62 |
| 5,606,660 A | * | 2/1997 | Estakhri et al. | 714/38 |
| 5,623,604 A | * | 4/1997 | Russell et al. | 717/167 |
| 5,740,178 A | | 4/1998 | Jacks et al. | |
| 5,822,581 A | * | 10/1998 | Christeson | 711/103 |
| 6,055,632 A | * | 4/2000 | Deegan et al. | 713/100 |
| 6,108,697 A | * | 8/2000 | Raymond et al. | 709/218 |
| 6,266,809 B1 | * | 7/2001 | Craig et al. | 717/173 |

FOREIGN PATENT DOCUMENTS

| | | |
|---|---|---|
| EP | 0 918 287 | 5/1999 |
| WO | WO 98/54642 | 12/1998 |

* cited by examiner

*Primary Examiner*—Albert Decady
*Assistant Examiner*—Esaw Abraham

(57) ABSTRACT

A method and apparatus in the form of a peripheral device for downloading firmware responsive to a request by an operatively connected client computer from a connected host or a source to the peripheral device of the type which has a non-volatile memory, the peripheral device being adapted to download the firmware having the operating instructions and data into the non-volatile memory with at least one backup image partition for storing basic configuration and utility operations relating to the firmware and at least one code image partition for storing the firmware. The method includes the steps of receiving a download file for the requested firmware from the client computer, saving a specific data image of the file into one of the image partitions designated by the data image, performing an error check on the data image saved in the designated image partition, terminating the process if an error is found, and repeating the steps of the process for the next data image of said file if no error is found.

18 Claims, 2 Drawing Sheets

METHOD AND APPARATUS FOR DOWNLOADING FIRMWARE TO A NON-VOLATILE MEMORY

Figure 1:
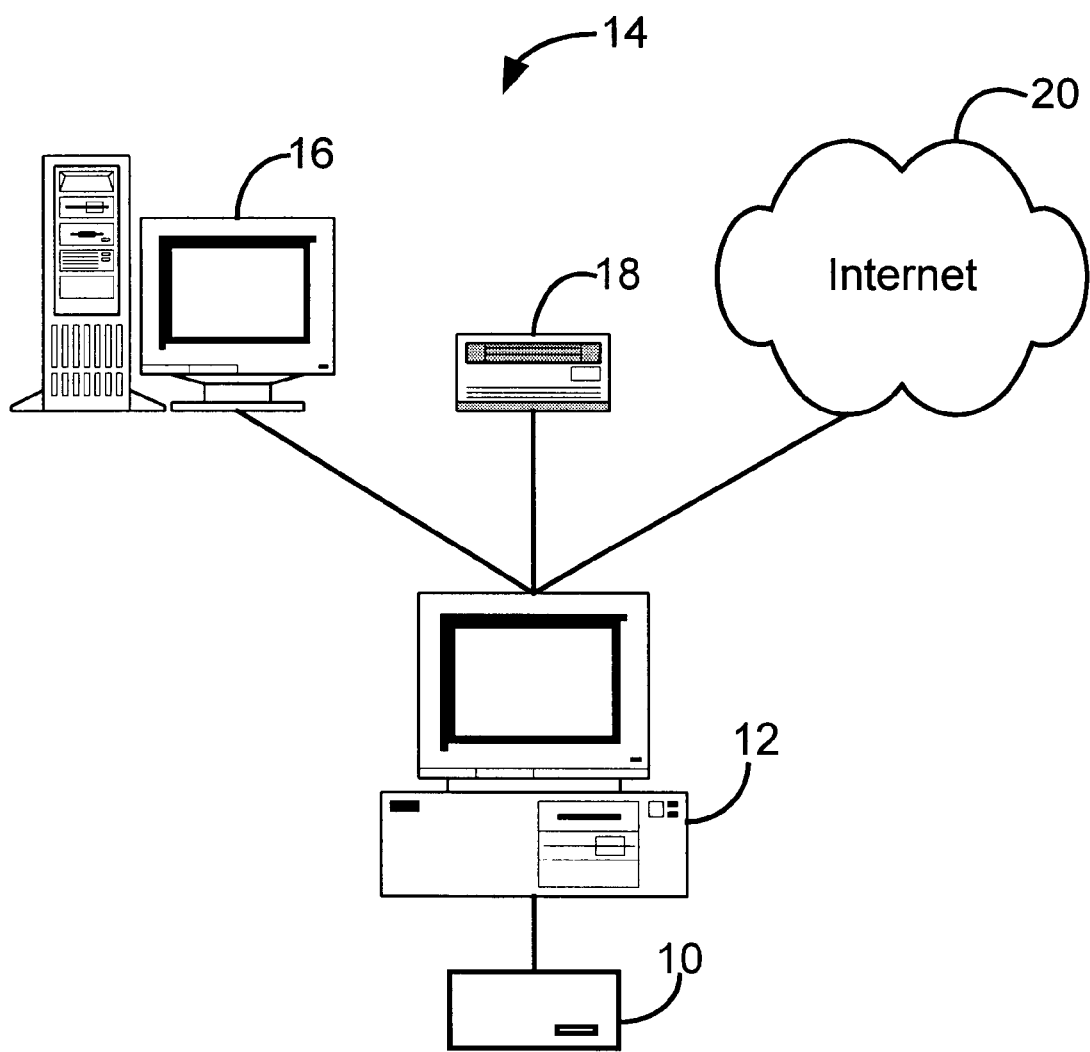

The present invention generally relates to a method and an apparatus for downloading firmware from a connected host or a source requested by an operatively connected client computer, more particularly, it relates to a method and apparatus in the form of a peripheral device for downloading firmware into a non-volatile memory with a backup image partition and a code image partition.

A peripheral device commonly stores its own configuration and operational codes for usage with a computer, which is generally stored as a firmware. The firmware is a collection of the essential programs for the peripheral device that remain in storage even when the system is turned off. The firmware is generally saved in the peripheral device using non-volatile memory or the programmable flash memory. Since the computers need to be upgraded in time, the firmware must also be upgraded for performance or to add new features. As a result, a new firmware must be downloaded and installed periodically by the users.

The non-volatile memory of the firmware is generally divided into several partitions with specific storage definitions according to the type of information that is being stored. For example, there may be four partitions, specifically the Basic Input/Output System ("BIOS") partition, the non-volatile data partition, the code image ("CI") partition, and the backup image ("BI") partition. In this case, the CI partition is used for storage of all the firmware. At the start of a download process, the BI partition stores the backup image of the firmware, which is the basic configuration and utility operations relating to the firmware. The code image of the firmware, which is the codes of the actual firmware, is then saved in the CI partition after a successful download of the backup image.

If the download is successful, the backup image will not be used at all. Because the code image is generally much larger than the backup image, an error, such as a power failure, may occur during the download process of the code image. In that case, the information from the backup image is used to restart the downloading process from the step of downloading the code image instead of starting the download process at the very beginning. The backup image allows for a fail-safe method of downloading.

Previous technology required that the backup image be executed during the download process before it could actually be used. More precisely, the backup image's instructions must first be carried out (i.e., the execution) before the peripheral device can actually use the basic configuration and utility operations saved in the BI partition to restart the download process in the event of a transmission interruption. This was so because the backup image was saved in the non-volatile memory; but at the same time, it was executed also from the non-volatile memory. Since the backup image did not take effect until execution, the transmission had to be interrupted while awaiting execution of the backup image. Then, the non-volatile memory switched back to the receiving mode.

One problem with this prior method was that the switching and the interruption of the transmission caused errors in greater frequency. As a result, the download process was unreliable.

Another problem was that the switch between the receiving and executing mode, and then switching back to the receiving mode for the CI partition significantly slowed down the download process.

Yet another problem was that the prior method depended upon the use of a simple network management protocol ("SNMP") and a trivial file transfer protocol ("TFTP"), which was often very inflexible. As a result, the prior method does not work well with the more standard software available today, such as hypertext transfer protocol ("HTTP") and file transfer protocol ("FTP").

Still another problem was that the prior method depended upon the SNMP Set Community Name for its security, which is transmitted in clear text over the network. Thus, the prior method was insecure because no cryptographic security existed.

Accordingly, an object of the present invention is to provide an improved method for downloading firmware to a peripheral device that does not require execution of the fail-safe data image until the end of the download process.

Another object of the present invention is to provide an improved method for downloading firmware to a peripheral device that is more reliable and faster.

Still another object of the present invention is to provide an improved method for downloading firmware to a peripheral device that is more secure.

A further object of the present invention is to provide an improved method for downloading firmware to a peripheral device that can accommodate the present standard software.

BRIEF SUMMARY OF THE INVENTION

The present invention generally relates to a method and an apparatus in the form of a peripheral device for downloading firmware responsive to a request by an operatively connected client computer from a connected host or a source, and more particularly to a method and peripheral device for downloading firmware into the non-volatile memory with a BI partition and a CI partition. The present method and peripheral device does not require the execution of the fail-safe data image, such as the backup image discussed earlier, during the download process in order for it to take effect, resulting in a more reliable, flexible, and faster method.

In accordance with this invention, the peripheral device first receives a download file for the requested firmware from the client computer. Then, it saves a specific data image of the file into one of the image partitions designated by the data image, and an error check is performed for the data image. If an error with the data image occurs, then the peripheral terminates the process. However, the process is repeated for the next data image of the file if no error is found.

Figure 2:
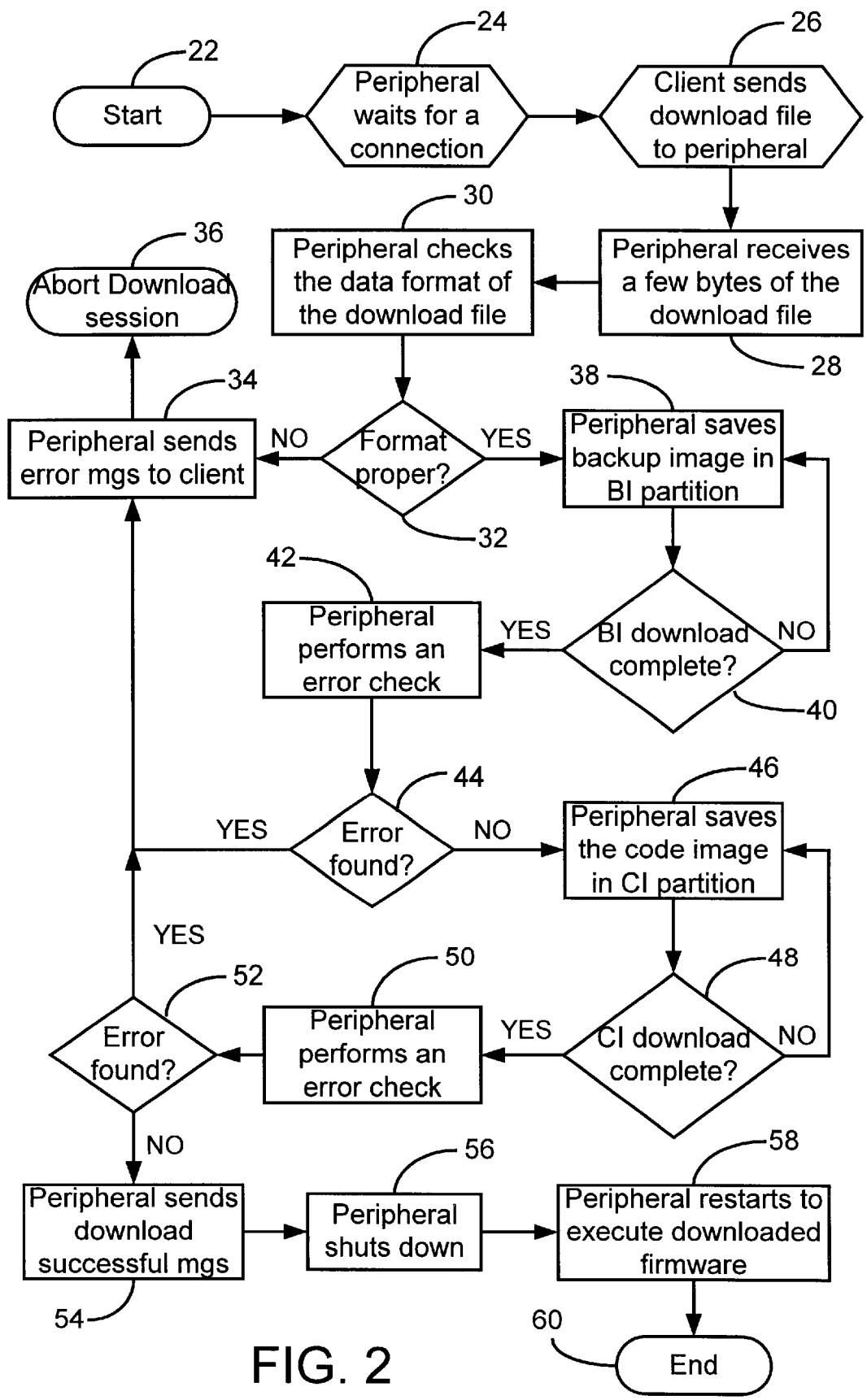

Other objects, features and advantages will become apparent upon reading the following detailed description, in conjunction with the attached drawings, in which:

FIG. 1 is a schematic diagram of an exemplary connection between a peripheral device and a client computer receiving from a host or a source in which the present invention may be implemented; and, FIG. 2 is a flowchart illustrating the preferred subroutine of the peripheral device during the download process.

TABLE OF ACRONYMS

The patent references several acronyms. The following table is provided to aid the reader in determining the meaning of the several acronyms:

BIOS=Basic Input/Output System
BI=Backup Image
CI=Code Image

CRC=Cyclic Redundancy Code Check
FTP=File Transfer Protocol
HTTP=Hypertext Transfer Protocol
RAM=Random Access Memory
SNMP=Simple Network Management Protocol
TFTP=Trivial File Transfer Protocol

DETAILED DESCRIPTION

Broadly stated, the present invention relates to a method and apparatus for downloading firmware from a connected host or a source requested by an operatively connected client computer, allowing for a fail safe download process that does not require the execution of the backup image data before the code image can be downloaded. The present process accommodates the storing of the complete requested firmware file in the non-volatile memory or programmable flash memory, and any execution processes are done using the random access memory ("RAM") instead of flash memory. Thus, the present method avoids switching between the receiving mode and the execution mode during the download process.

Turning now to FIG. 1, a schematic diagram of an exemplary connection between a peripheral device and a client computer receiving from a connected host or a source is shown. Several examples of the source or the connected host are shown, but the implementation of the present invention can vary, and an array of implementations are within the scope of the present invention. In this example, a peripheral device 10 is connected to a client computer 12. The client computer 12 is connected to a connected host or a source 14, such as another computer 16, a CD Rom drive 18, or the Internet 20, for receiving data, which are to be transmitted to the peripheral device 10. However, the client computer 12 may not necessarily be connected to another computer 16 or the Internet 20. For example, the client computer 12 may be receiving data from a CD Rom drive 20. In fact, the firmware file can also be stored in the hard drive (not shown) of the client computer 12.

FIG. 2 shows a flowchart of the preferred subroutine of the peripheral device 10 during the download process. Before the start of the process (block 22), the peripheral device 10 must be operatively connected to the client computer 12 (block 24). In addition, the client computer 12 must initiate the start of the subroutine by sending the download file to the peripheral device 10 (block 26). After the initiation, the peripheral device 10, at first, receives only a few bytes of the download file (block 28) for checking the data format (block 30) to ensure that a proper file is being received. If the format of the download file is not proper (block 32), the peripheral device 10 sends an error message to the client computer 12 (block 34) and the download process is then aborted (block 36). On the other hand, if the format of the download file is proper (block 32), the peripheral device 10 starts saving the backup image of the download file in the BI partition of the non-volatile memory (block 38).

As noted earlier, the backup image contains the basic configuration and utility operation relating to the download and firmware, which is used as a fail-safe device in the event that the download process is interrupted. The backup image is preferably the first data image to be saved in the process, however, it is not necessary for implementation of the present invention. For example, there may be instances when the download file is divided into more than just the backup image and code image, and the third data image may be the smallest in size. In such a case, it may be more desirable to download the third data image first since it is the smallest part of the download file. There may also be other instances where downloading the backup image first would be inefficient or impracticable. Notwithstanding these other possibilities, downloading of the backup image first is still preferred in the present invention, although it is unnecessary. Nonetheless, the order is generally defined by the download file rather than the peripheral device 10.

The peripheral device 10 continues saving the backup image into the BI partition (block 38) until the download is completed (block 40). When the download is complete (block 40), the peripheral device 10 performs an error check on the backup image (block 42). More specifically, it is preferred that a cyclic redundancy code check ("CRC") is used for the error check. If an error is found (block 44), an error message will be sent to the client computer 12 (block 34) and the download process is terminated (block 36).

Otherwise, the peripheral device 10 continues to save the code image into the CI partition (block 46). The saving of the code image (block 46) continues until completion (block 48), which is followed by another error check specifically for the downloaded code image (block 50). Similarly, the CRC is preferred, but other data error checks may be used and are within the scope of the present invention. An error message is again sent out to the client computer (block 34) if an error is found by the CRC (block 52), and the download process is aborted as a result (block 36). But if an error is not found (block 52), the peripheral device 10 sends a download successful message to the client computer 12 (block 54). The peripheral device shuts down (block 56) to restart in order to execute the downloaded firmware (block 58) and the process is finished (block 60).

The code image represents the actual firmware of the download file. To distinguish the code image from the backup image, the code image is the part of the file that the peripheral device 10 uses for the actual upgrade. On the other hand, the backup image is information that the peripheral device 10 uses if there is a break in the download process of the code image. Although in this example, only the backup image and the code image are shown. The present method contemplates downloading other data image and are within the scope of the present invention. Furthermore, the labeling of the backup image and code image is arbitrary and has no effect on the present invention. Thus, other names for the plurality of memory partitions may be used and are also within the scope of the present invention. It is further contemplated that the present invention can download firmware having more than two data image types.

From the foregoing description, it should be understood that an improved method and peripheral device for downloading firmware have been shown and described which have many desirable attributes and advantages. The method and peripheral device eliminate the need for the fail-safe data image of the download file to be executed during the download process before becoming effective. As a result, the switching mode of the non-volatile memory is no longer necessary, resulting in a more reliable, flexible and faster method. The present invention allows for the saving of the download file into the non-volatile memory while using only RAM for executions.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for downloading firmware responsive to a request by an operatively connected client computer from a connected host or a source to a peripheral device of the type which has a non-volatile memory, the peripheral device being adapted to download the firmware comprising the operating instructions and data into the non-volatile memory having at least one backup image partition for storing basic configuration and utility operations relating to the firmware and at least one code image partition for storing the firmware, the method comprising the steps of:

receiving a download file for the requested firmware from the client computer;

saving a specific data image of said file into one of the image partitions designated by said data image;

performing an error check on said data image saved in the designated image partition;

initiating a termination process if an error is found; and, repeating the above steps of the process for the next data image of said file if no error is found.

2. The method according to claim 1 further comprises the step of initiating said termination process once all the data images for said file have been received for each designated image partition.

3. The method according to claim 2 wherein said step of ending the process further comprises the steps of:

sending a download-success message to the client computer;

shutting down the peripheral device; and, restarting the peripheral device to execute said downloaded firmware.

4. The method according to claim 1 wherein said specific data image is determined by said file.

5. The method according to claim 1 wherein said specific data image is a backup image of a basic configuration and utility operations of the firmware.

6. The method according to claim 5 wherein said backup image is used for restoring the download process using the information of the basic configuration and utility operations of the firmware.

7. The method according to claim 5 wherein said backup image is the first data image for downloading.

8. The method according to claim 1 wherein said specific data image is a code image of the firmware.

9. The method according to claim 1 wherein prior to said step of saving a specific data image, further comprising the steps of:

checking said file for an acceptable format;

receiving said file if the format is acceptable; and, initiating said termination process if the format is unacceptable.

10. The method according to claim 9 wherein said step of checking said file further comprises the step of reading the first few bytes of said incoming file.

11. The method according to claim 9 wherein said step of initiating said termination process further comprises the step of sending an error message to the client.

12. The method according to claim 1 wherein said step of saving a specific data image further comprises the steps of:

receiving said data image from the client; and, storing said data image in said designated image partition.

13. The method according to claim 1 wherein said step of performing an error-check further comprises the step of executing a cyclic redundancy code check for said data image.

14. The method according to claim 1 wherein said step of initiating said termination process further comprises the step of sending an error message to the client.

15. The method according to claim 1 further comprises the step of executing the data images from random access memory once all the date images for said file have been received for each designated image partition.

16. The method according to claim 1 wherein the code image is downloaded without executing the backup image.

17. A peripheral device for downloading firmware from a connected host or a source to a peripheral device that has been requested by an operatively connected client computer, the peripheral device having a non-volatile memory with at least one backup image partition for storing basic configuration and utility operations relating to the firmware and at least one code image partition for storing the firmware, said peripheral device comprising:

means for receiving a file for the requested firmware from the client computer;

means for saving a specific data image of said file into one of the code image partitions designated by said data image;

means for performing an error check on said data image saved in the designated image partition;

means for initiating a termination process if an error is found; and, means for repeating the process for the next data image of said file if no error is found.

18. A computer program product comprising a computer readable code stored on a computer readable medium that, when executed, the computer program product causes a computer to:

receive a download file for the requested firmware from the client computer;

save a specific data image of said file into one of the image partitions designated by said data image;

perform an error check on said data image saved in the designated image partition;

initiate a termination process if an error is found; and, repeat the above steps of the process for the next data image of said file if no error is found.

* * * * *